United States Patent [19]

Shida et al.

[11] 4,145,575

[45] Mar. 20, 1979

[54] FREQUENCY-DIVISION MULTIPLEXED SIGNAL TRANSMISSION SYSTEM

[75] Inventors: Seiya Shida; Shigeo Fushimi; Masao Sato, all of Tokyo, Japan

[73] Assignee: Nippon Electric Co., Ltd., Tokyo, Japan

[21] Appl. No.: 843,917

[22] Filed: Oct. 20, 1977

[30] Foreign Application Priority Data

Oct. 21, 1976 [JP] Japan .................................. 51-126735
Apr. 22, 1977 [JP] Japan .................................. 52-47079

[51] Int. Cl.² ............................................. H04J 1/08
[52] U.S. Cl. ............................................. 179/15 FD
[58] Field of Search ........... 179/15 FD, 15 FS, 2.5 R; 340/15.5 CF; 364/724; 343/175

[56] References Cited

U.S. PATENT DOCUMENTS

| | | | |
|---|---|---|---|
| 3,079,464 | 2/1963 | Baumel | 179/15 FD |
| 3,364,311 | 1/1968 | Webb | 179/15 FD |
| 3,605,019 | 9/1971 | Cutter | 179/15 FD |
| 3,969,585 | 7/1976 | Boulanger | 179/15 FD |
| 3,991,277 | 11/1976 | Hirata | 179/15 FD |

Primary Examiner—William C. Cooper
Assistant Examiner—Joseph A. Popek
Attorney, Agent, or Firm—Sughrue, Rothwell, Mion, Zinn and Macpeak

[57] ABSTRACT

A frequency division multiplexing system is disclosed having a plurality of individual modulators which modulate respective modulating signals onto respective carrier frequencies. The carrier frequencies are selected to have a frequency separation so that when modulated signals are combined, significant parts thereof do not overlap in frequency. The combined modulated signals are filtered by comb filters which suppress portions of the frequency spectra intermediate the significant portions.

9 Claims, 11 Drawing Figures

FREQUENCY-DIVISION MULTIPLEXED SIGNAL TRANSMISSION SYSTEM

BACKGROUND OF THE INVENTION

The present invention relates to a transmission system for transmitting frequency-division multiplexed (hereinafter abbreviated as FDM) signals each being modulated by a speech signal or the like.

An FDM carrier telephony system has, as indispensable constituent elements, a number of filters for suppressing undesired spectra such as undesired side bands and carriers contained in amplitude-modulated signals. Also, filters are further needed to shape the frequency spectra, which tend to spread over the frequency axis due to the frequency modulation signals, into desired transmission bands. For this purpose, a conventional FDM signal transmission system has a filter at a stage following the respective modulator in a one-to-one correspondence. One example of such a conventional FDM transmission system is described in "Phillips Telecommunication Review", Vol. 33, No. 2, pp. 86–96, published in June issue 1975 (Literature 1).

However, such a conventional system is costly to manufacture because of the need for at least as many filters as there are transmission channels.

SUMMARY OF THE INVENTION

An object of the present invention is therefore to provide an FDM signal transmission system free from the above-mentioned disadvantage.

The present system comprises a plurality of input terminals for modulation signals, a plurality of modulator means provided in a one-to-one correspondence to said input terminals and associated with a plurality of carriers having a predetermined frequency difference therebetween for modulating the plurality of carriers respectively with said plurality of modulation signals, respectively, means for combining the modulated signals to arrange them on the same frequency axis, and a comb filter for suppressing undesired spectra contained in the output signal of said combining means.

The present invention is compact and economical because it eliminates the requirement of filters placed after each amplitude-modulator or FSK (frequency shift keying)-modulator.

BRIEF DESCRIPTION OF THE DRAWINGS

FIGS. 5($a$) and 5($b$) show block diagrams of a comb filter to be used in the present system.

FIG. 6 shows a diagram for showing a distribution of signal components of an FSK-modulated signal.

DETAILED DESCRIPTION OF THE PREFERRED EMBODIMENTS

Figure 1:
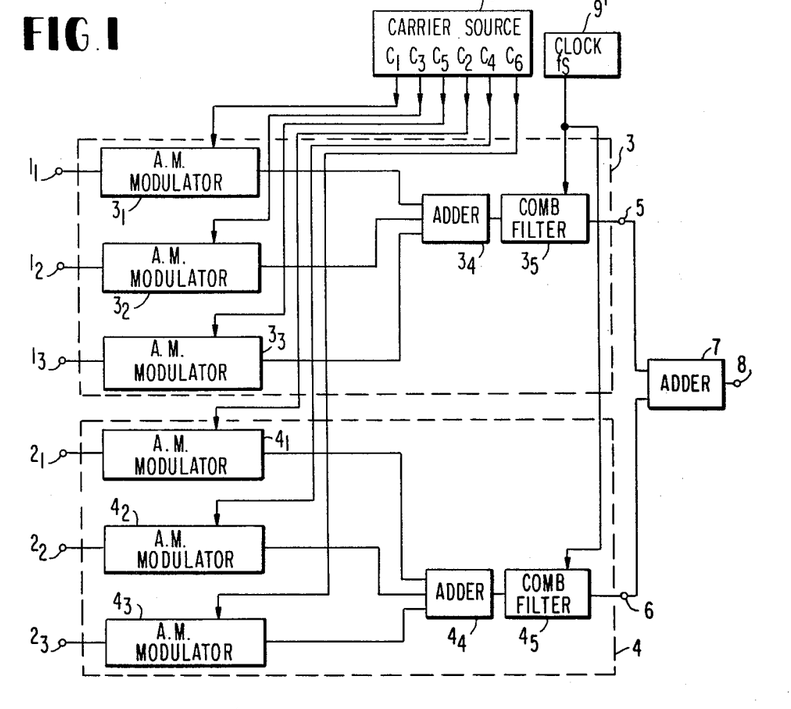
FIG. 1 shows a block diagram of a first embodiment of the present invention.

Referring to FIG. 1 the first embodiment comprises basic converter stages 3 and 4 having a plurality of input terminals $1_1$, $1_2$ and $1_3$ and $2_1$, $2_2$ and $2_3$, respectively, to which modulation signals are applied, and output terminals 5 and 6 from which a first-stage FDM signal is obtained. An adder 7 combines the output signals of the basic converter stages 3 and 4 into the combined FDM signal at an output terminal 8. The stage 3 includes amplitude modulators $3_1$, $3_2$ and $3_3$ for amplitude-modulating the carriers $C_1$, $C_3$ and $C_5$ from a carrier source 9 with the input modulation signals appearing at terminals $1_1$–$1_3$, respectively. An adder $3_4$ combines the output signals of modulators $3_1$–$3_3$ on the same frequency axis, and a comb filter $3_5$ suppresses undesired spectra in the combined signal. The stage 4 has the same contruction as the stage 3. The adders $3_4$, $4_4$ and 7 are formed of, for instance, a well-known hybrid coil or an operational amplifier. With regard to the comb filters $3_5$ and $4_5$, reference is made to the disclosure in the "PROCEEDINGS OF THE IEEE", Vol. 55, No. 2, pp. 149–171, published in February 1967, especially FIG. 20($a$) on page 166, (Literature 2). Since the input signal to the filter disclosed in FIG. 20($a$) of Literature 2 consists of values selectively sampled from a continuous wave, in case where such filters are employed as the comb filters $3_5$ and $4_5$ in the first embodiment, it is necessary to use A-D (analog-to-digital) and D-A (digital-to-analog) converters at a stage preceding or following each of such filters. However, if a charge transfer device (CTD) with the functions of sampling an input signal and transferring the sampled values in response to a clock signal is employed as a delay element in the comb filter, the input signal applied to such a filter may be a continuous signal.

Figures 5A, 5B, 6:
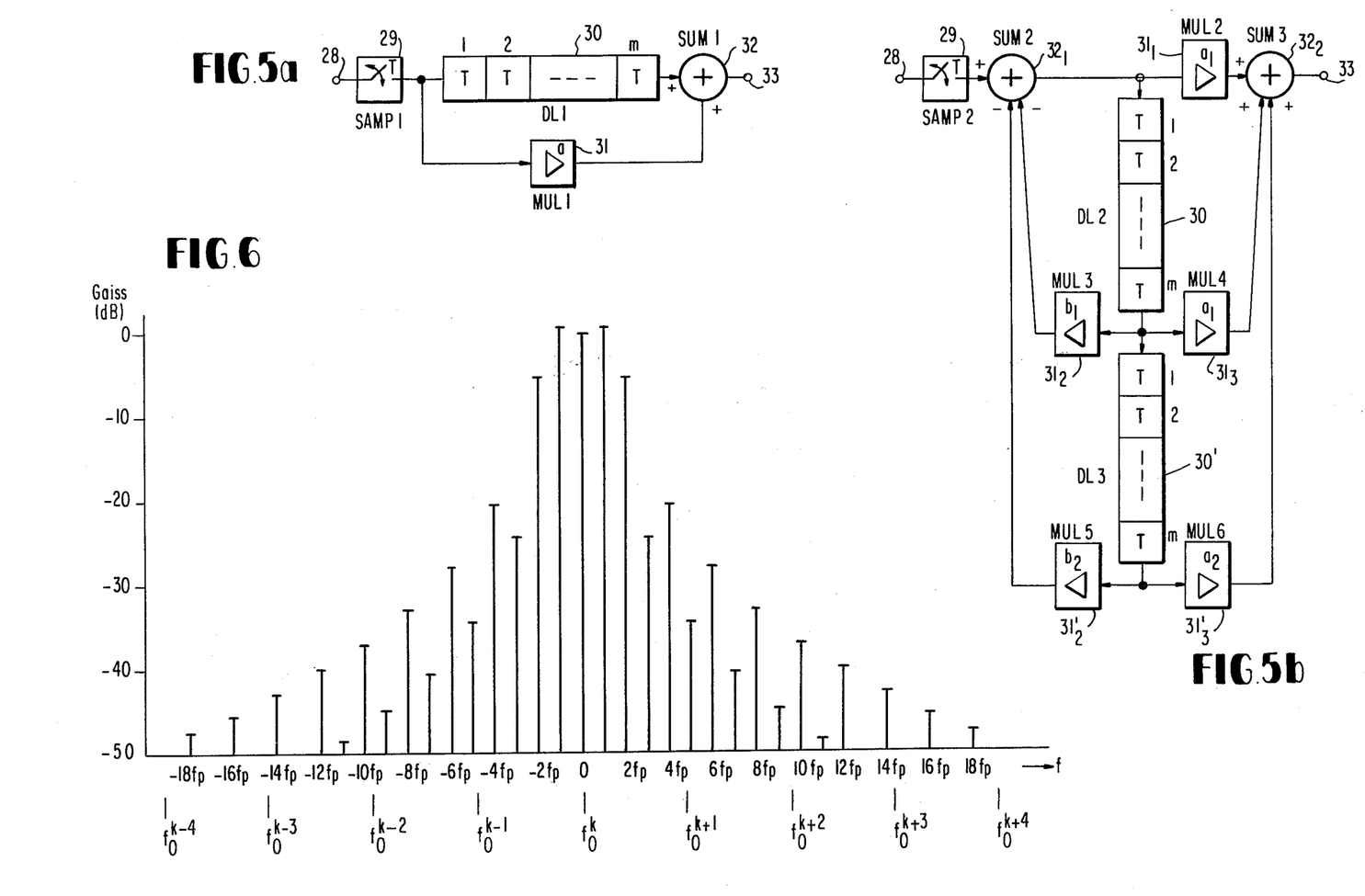

FIGS. 5($a$) and 5($b$) show block diagrams of comb filters using the CTD for the latter purpose. In these figures, however, for the purpose of representing one CTD having the above-mentioned functions, a delay element and a sampler are illustrated.

Referring further to FIG. 1, clock signals required for the charge transfer and sampling are fed from a clock signal source 9'. The comb filters $3_5$ and $4_5$ constructed in the above-described manner permit pass bands and elimination bands to occur alternately at a predetermined period.

Figure 2:
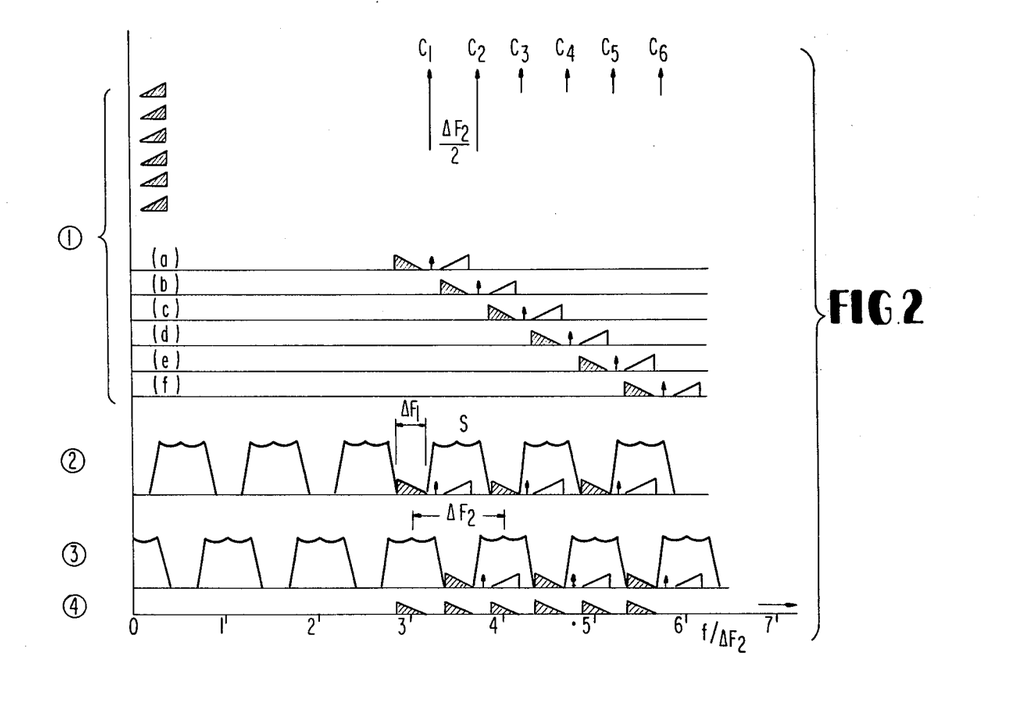
FIG. 2 shows a diagram for explaining the operation of the first embodiment.

Now the operation of the present system with the structure mentioned previously will be explained in detail with reference to FIGS. 1 and 2. The speech signals applied as inputs to the modulators will have equal band-widths of $\Delta F_1$, as shown in the upper part of FIG. 2. Also, it is assumed that the frequencies of the carriers $C_1$, $C_3$ and $C_5$ and $C_2$, $C_4$ and $C_6$ applied to the amplitude modulators $3_1$–$3_3$ and $4_1$–$4_3$, respectively, differ from each other by $\Delta F_2/2$, also as indicated in FIG. 2. Thus, the modulated signals will have upper and lower side bands and will be arranged along the frequency axis at intervals of $\Delta F_2/2$ as shown at (a) through (f) of FIG. 2 ((a) to (f) in FIG. 2 ①). Odd-numbered ones of those modulated signals are combined by the adder $3_4$ and then, undesired spectra (upper side bands) appearing within the range represented by reference character S are suppressed by the comb filter $3_5$, so that the consequent frequency spectra are arranged on the frequency axis at an interval of $\Delta F_2/2$ as shown in line 2 of FIG. 2. Likewise, even-numbered ones of the modulated signals are converted into frequency spectra arranged respectively on the frequency axis at an interval of $\Delta F_2$, as shown in line 3 of FIG. 2. Next, the modulated signals from which undesired spectra are suppressed by the comb filters $3_5$ and $4_5$, in the above-described manner, are combined by the adder 7. As a result, the frequency spectra of the respective output signals of the comb filters $3_5$ and $4_5$ are jointly arranged on the frequency axis in an interlaced relation as shown in line 4 of FIG. 2. The value of $\Delta F_2$ is to be at least as large as $2\Delta F_1$ to insure that the selected side bands of adjacent channels do not overlap in frequency. For instance, in one embodiment the values selected are:

$$\Delta F_1 = 3.1 \text{ KHz and } \Delta F_2 = 8.9 \text{ KHz.}$$

Figure 3:
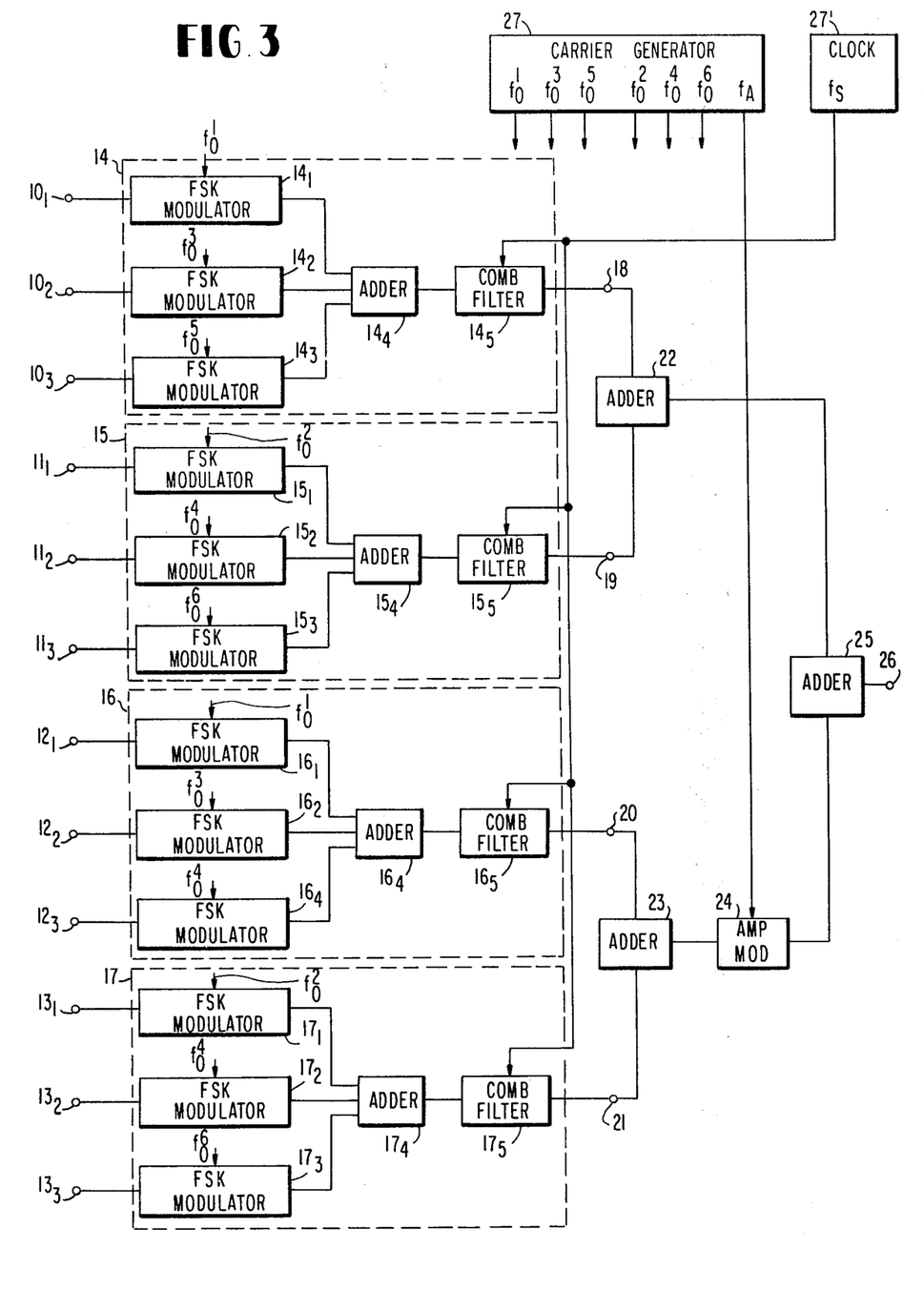
FIG. 3 shows a block diagram of a second embodiment of the present invention.

Referring to FIG. 3 showing a second embodiment of the present invention, telegraph signals are employed as input modulation signals. More particularly, a basic converter stage 14 is comprised of input terminals $10_1$–$10_3$ to which the telegraph signals are supplied. FSK-modulators $14_1$–$14_3$ are provided for the respective terminals $10_1$–$10_3$. An adder $14_4$ combines the output signals from the FSK-modulators, and a comb filter $14_5$ provides spectra-shaping of the combined signal. Reference numerals 15–17 designate the other basic converter stages with construction similar to the stage 14. FSK-modulator $14_1$ is a frequency-modulator in which two oscillators having different oscillation frequencies $f_1$ and $f_2$ are switched depending on the mark and space information of the telegraph signal, and the center frequency $f_0$ on the modulator is represented by $f_1 + f_2/2$. The other FSK-modulators are similarly constructed. The output signals of the converter stages 14 and 15 are combined together by an adder 22, while the output signals of the converter stages 16 and 17 are combined together by an adder 23. Moreover, the output signal of the adder 23 is, after passing through an amplitude modulator 24, combined with that of the adder 22 by another adder 25.

Now the operation of the present system with the construction illustrated in FIG. 3 will be described in conjunction with FIG. 4.

As is well-known, spectra of a modulated signal obtained by the FSK-modulation of carriers $f_{1k}$ and $f_{2k}$ in an FSK-modulator having a center frequency $f_o^k$, expands over an infinite frequency range, and the general distribution of the spectra is represented as shown in FIG. 6 which illustrates the respective components by relative levels with respect to the component at the center frequency $f_o^k$. Reference character $f_p$ represents a frequency dependent upon the telegraph transmission speed. For instance, $f_p$ is equal to 50 Hz for a telegraph speed of 100 B (baud). Reference characters $f_o^{k-4}$, $f_o^{k-3}$, ... $f_o^{k+3}$ and $f_o^{k+4}$ represents the positions of the respective center frequencies of the FSK-modulators of FIG. 3, and the interval of their respective center frequencies corresponds to that between the channels to be frequency-division multiplexed. According to the C.C.I.T.T. recommendation, regulation is made on the levels of the respective signal spectra of the FSK-modulated signal having a center frequency of $f_o^k$, and according to this regulation, it is remarked that even if spectra having levels lower than the level of the center frequency $f_o^k$ by $-40$ dB or more are not suppressed, these unsuppressed spectra will not substantially give an adverse effect upon the transmission signals in the other channels. As a result, of the signal spectra within the frequency ranges of $-2f_p$–$-14f_p$ and $+2f_p$–$+14f_p$ are suppressed, no adverse influence is given upon the modulated signals having center frequencies $f_o^{k-4}$ and $f_o^{k+4}$ separated from the center frequency $f_o^k$ by 4 channels.

Figure 4:
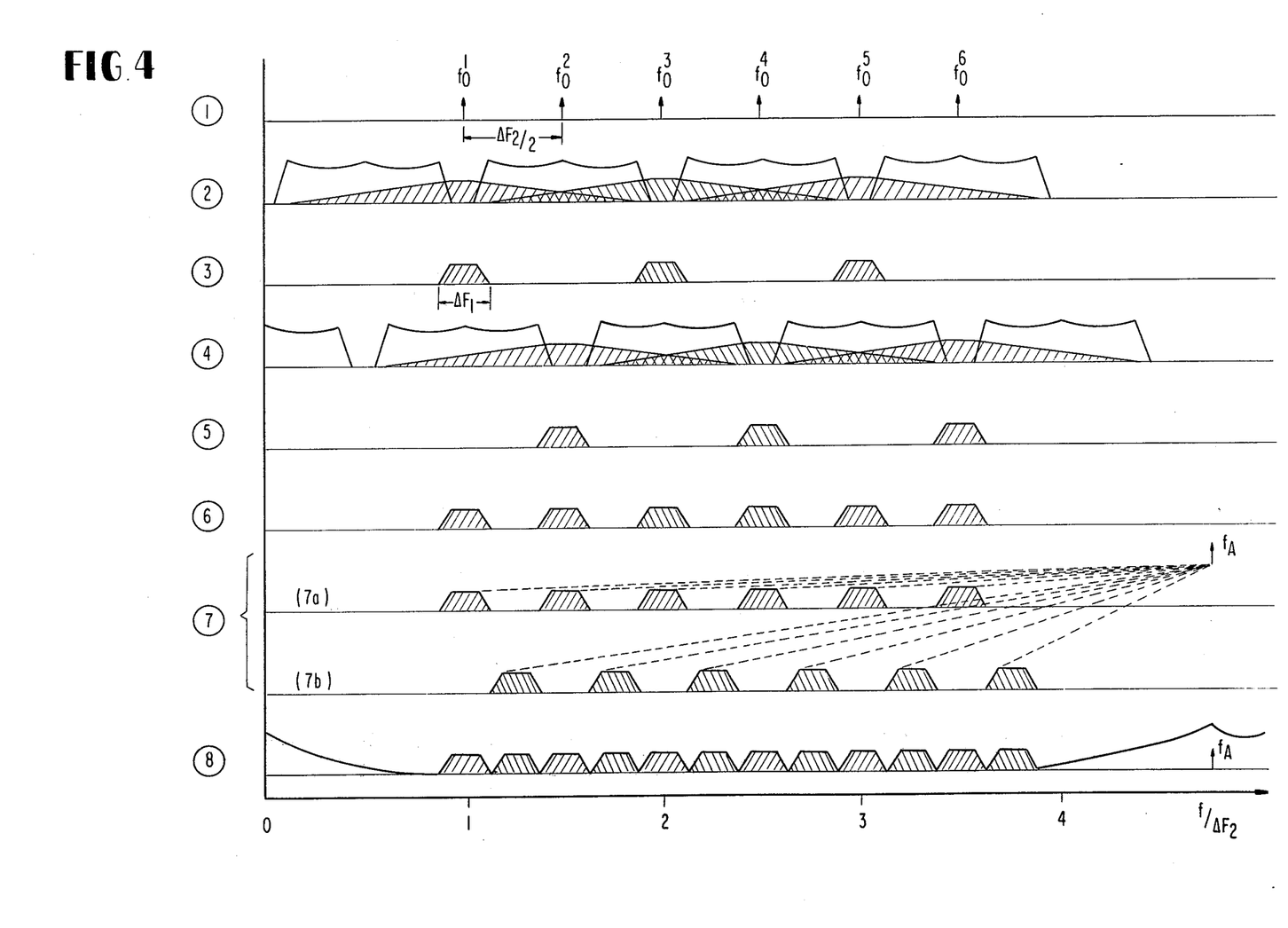
FIG. 4 shows a diagram for explaining the operation of the second embodiment.

It will not be assumed that the center frequencies of the FSK-modulators $14_1$–$14_3$ and $15_1$–$15_3$ have an interval $\Delta F_2/2$ are equal to $f_o^1$, $f_o^3$ and $f_o^5$ and $f_o^2$, $f_o^4$ and $f_o^6$, respectively, as shown in line 1 of FIG. 4. The output frequency bands FSK-modulators $14_1$–$14_3$ shown by the cross-hatched sections of line 2 are combined by the adder $14_4$. The output of adder $15_4$ is shown similarly in line 4.

Assuming that the center frequencies of the FSK-modulators $16_1$–$16_3$ and $17_1$–$17_3$ are equal to those of the FSK-modulators $14_1$–$14_3$ and $15_1$–$15_3$, respectively, the first-stage FDM signals combined by the adders $16_4$ and $17_4$ will also be as shown in lines 2 and 4 of FIG. 4. The first-stage FDM signals combined by the adders $14_4$ and $16_4$ as shown in line 2 are applied to the comb filters $14_5$ and $16_5$ which suppress frequencies in the ranges S', resulting in an output frequency spectrum as shown in line 3. Likewise, line 5 represents the frequency spectrum output of the comb filters $15_5$ and $17_5$. The frequency response characteristics of filters $15_5$ and $17_5$ differ from those of $14_5$ and $16_5$ by $\Delta F_2/2$. The output signals of the comb filters $14_5$ and $15_5$ and the comb filters $16_5$ and $17_5$ are respectively combined together by the adders 22 and 23, resulting in the spectrum of line 6. The output signal of the adder 23 is frequency-shifted by $\Delta F_2/2$ (line 7b) relative to the output signal of the adder 22 (line 7a) by the amplitude modulator 24. The output signal of the adder 22 and and the output signal of the amplitude modulator 24 are combined together by the adder 25 to result in the spectrum of line 8. It should be noted that the frequency-shift caused by the amplitude modulator 24 carried out with a frequency such that the individual transmission bands may not overlap with each other after the combining operation of adder 25, and that in the example of FIG. 4, this frequency width is selected at $\Delta F_2/4$. The carriers and clock signals required for the operations of the FSK-modulators, the amplitude modulator and the comb filters are supplied from a carrier source 27 and a clock signal source 27' of FIG. 3. In the illustrated embodiment, the transmission speed is selected at 100 bauds, the center frequency and shift width of the FSK-modulator $14_1$ are selected at 480 Hz and 120 Hz, respectively, and the transmission bandwidth of the modulated signal after the spectra shaping and the difference between the respective center frequencies $f_o^1$ to $f_o^6$ are selected at $\Delta F_1 = 120$ Hz and $\Delta F_2/2 = 480$ Hz, respectively.

Figure 7:
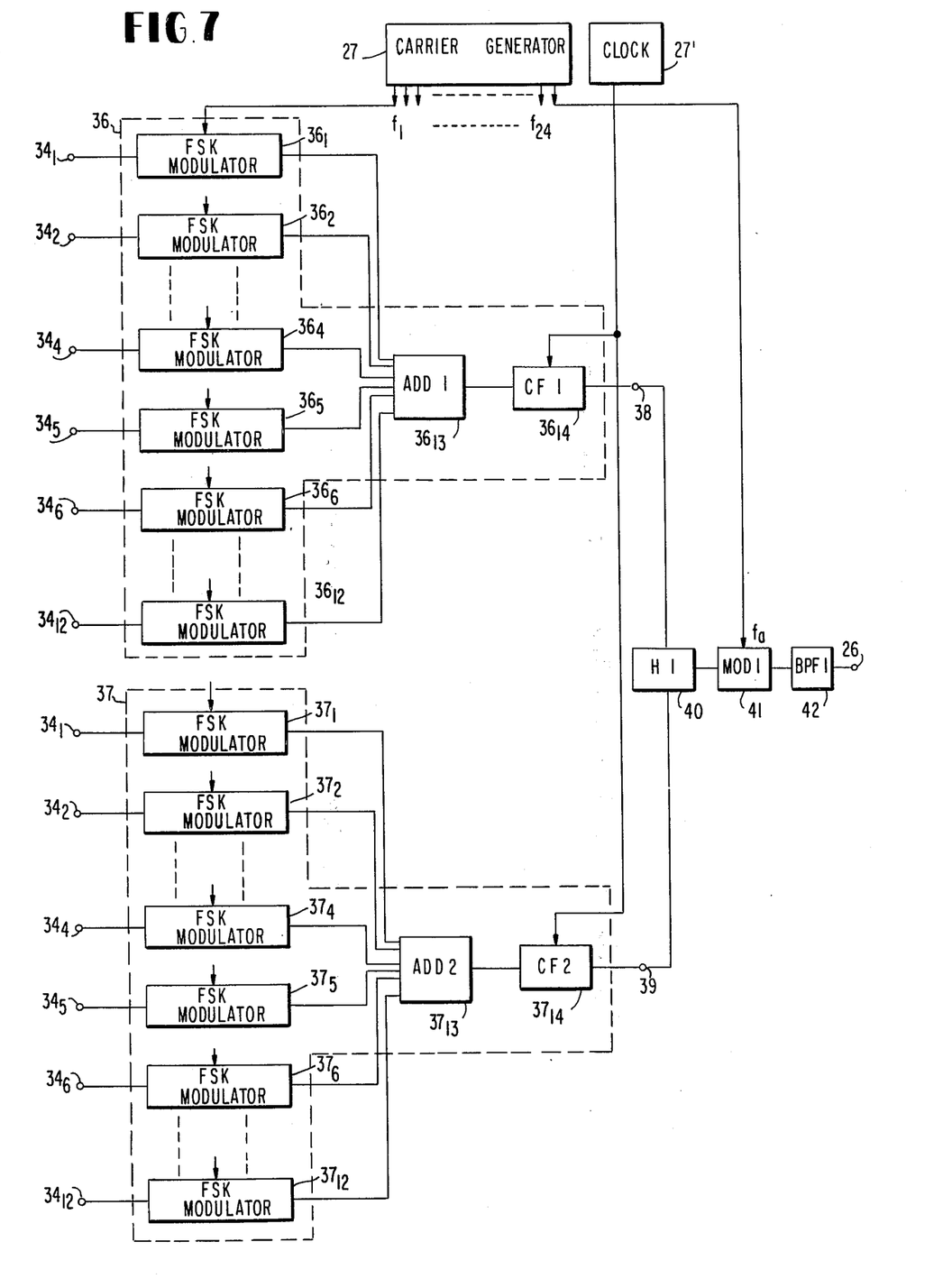
FIG. 7 shows a block diagram of a third embodiment of the present invention.

The third embodiment shown in FIG. 7 comprises a first converter stage 36 including a plurality of input terminals $34_1$–$34_{12}$ to which modulation signals are fed, FSK-modulators $36_1$–$36_{12}$ connected to these input terminals and having center frequencies equal to a frequency 4 m (m being an integer) times as high as the transmission bandwidth $\Delta F_1/1$ of the modulated signals, an adder $36_{13}$ for combining the output signals of these FSK-modulators on the same frequency axis, and a comb filter $36_{14}$ for eliminating undesired spectra in the combined signal; a second converter stage 37 having the same construction as said first converter stage 36; an adder 40 for combining the output signals of these first and second converter stages; a modulator 41 for amplitude-modulating a predetermined carrier with the output signal of the adder 40; and a band-pass filter 42 for eliminating undesired spectra from the output signal of the modulator 41.

Figure 8:
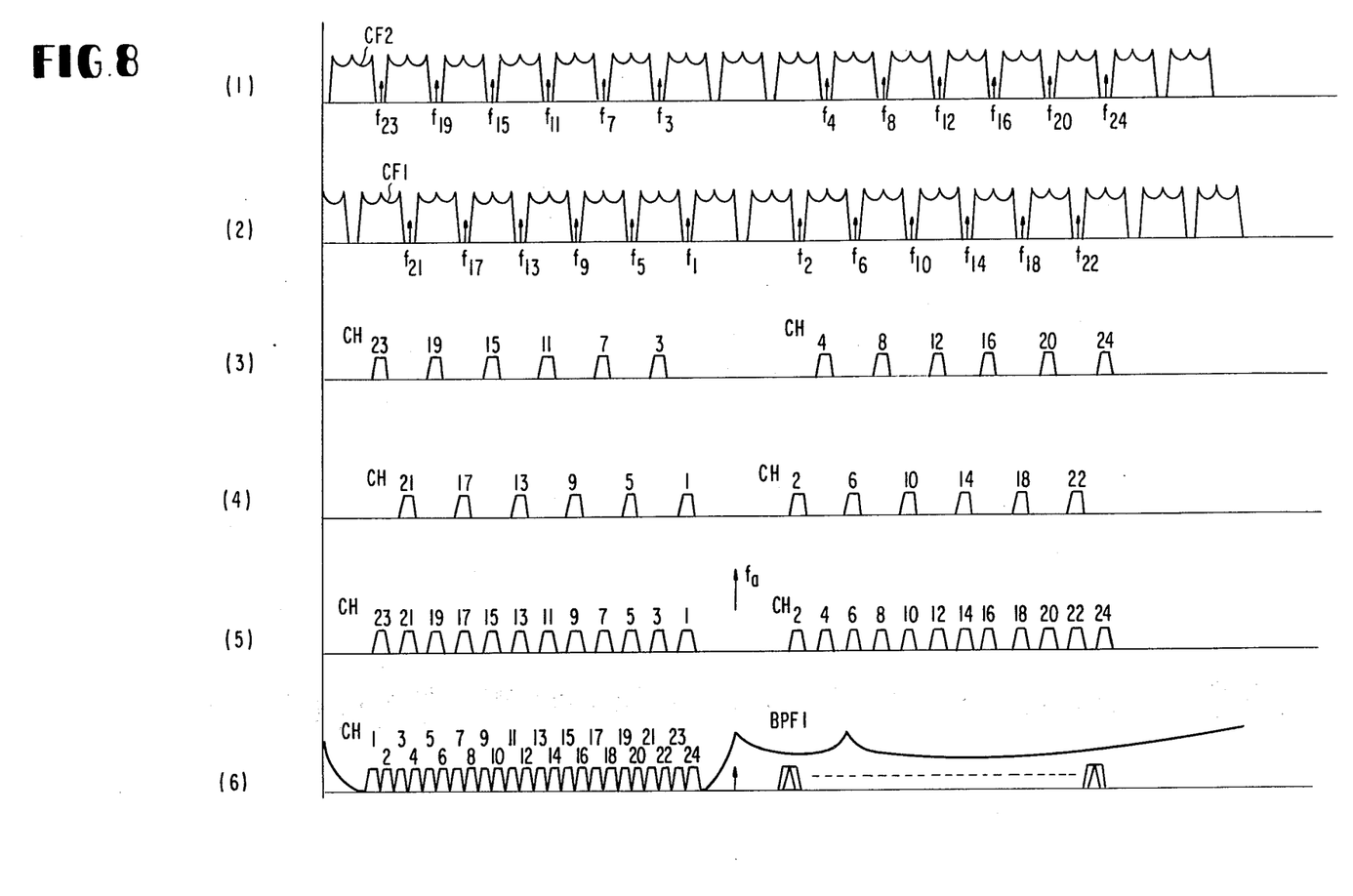
FIG. 8 shows a diagram for explaining the operation of the third embodiment.

Now the operation of the transmission system of the present invention of FIG. 7 will be described by referring to FIG. 8. Among the FSK-modulators $36_1 \ldots 36_{12}$, the center frequencies of the odd-numbered FSK-modulators $36_1$, $36_3$, ... and $36_{11}$ are represented by reference characters $f_1$, $f_5$, ... and $f_{21}$, while among the FSK-modulators $37_1, \ldots,$ and $37_{12}$, the center frequencies of the odd-numbered FSK-modulators $37_1$, $37_3$, ..., and $37_{11}$ are represented by reference characters $f_3$, $f_7$, ..., and $f_{23}$, and the differences between adjacent ones of said center frequencies such as $f_1$ and $f_3$ or $f_3$ and $f_5$ are made equal to $4\Delta F_1$ ($\Delta F_1$ being a transmission bandwidth of a signal that has been shaped in spectra after FSK-modulated). Likewise, the center frequencies of the even-numbered FSK-modulators $36_2$, $36_4$, ..., and $36_{12}$ and $37_2$, $37_4$, ..., $37_{12}$, are represented by reference characters $f_2$, $f_6$, ..., and $f_{22}$ and $f_4$, $f_8$ ..., and $f_{24}$ respectively adjacent ones differing from each other by $4\Delta F_1$. In addition, the differences between the center frequencies $f_1$ and $f_2$ and between the center frequencies $f_3$ and $f_4$ are selected equal to or larger than $8\Delta F_1$. Under the above-mentioned assumption, the center frequencies $f_1, f_5, \ldots,$ and $f_{21}$ and $f_2, f_6, \ldots,$ and $f_{22}$ are respectively frequency-converted by telegraph signals fed to the input terminals $34_1$, $34_3 \ldots,$ and $34_{11}$ and $34_2$, $34_4. \ldots,$ and $34_{12}$ in the FSK-modulators $36_1$, $36_3 \ldots,$ and $36_{11}$ and $36_2$, $36_4, \ldots,$ and $36_{12}$, and then, combined by the adder $36_{13}$ (FIG. 8, line 2). The combined signal has its undesired spectra suppressed by the comb filter $36_{14}$ resulting in a spectrum as shown in line 4 of FIG. 8. Similar operations are carried out in the basic converter stage 37, and the output signal takes the spectra as shown in FIG. 8, lines 1 and 3. After the output signals of the comb filters $36_{14}$ and $37_{14}$ are combined by the adder 40, as shown in line 5, if a carrier frequency $f_a$ is applied to the modulator 41 and modulated by such combined output signal, and if the lower side band is passed by the band-pass filter 42, a frequency-division multiplexed signal having spectra on the frequency axis is obtained as shown in line 6 of FIG. 8. It is to be noted that the center frequencies $f_1, \ldots,$ and $f_{24}$ are supplied from the carrier source 27 constructed of a single oscillator and an appropriate number of frequency-dividers and/or frequency multipliers.

In the third embodiment, the transmission speed is selected at 50 bauds, the center frequencies $f_1$, $f_{23}$ and $f_2$, $f_{24}$ of the FSK-modulators $36_1$, $37_{11}$ and $36_2$, $37_{12}$ are selected at 480 Hz, 3120 Hz and 4080 Hz, 6720 Hz, respectively, and the transmission bandwidth $\Delta F_1$ and the carrier frequency $f_a$ of the modulated signal are selected at $\Delta F_1 = 60$Hz and $f_a = 3540$ Hz, respectively. The comb filters $36_{13}$ and $37_{13}$ have such response characteristics that pass-bands are iterated at every 480Hz.

Figure 9:
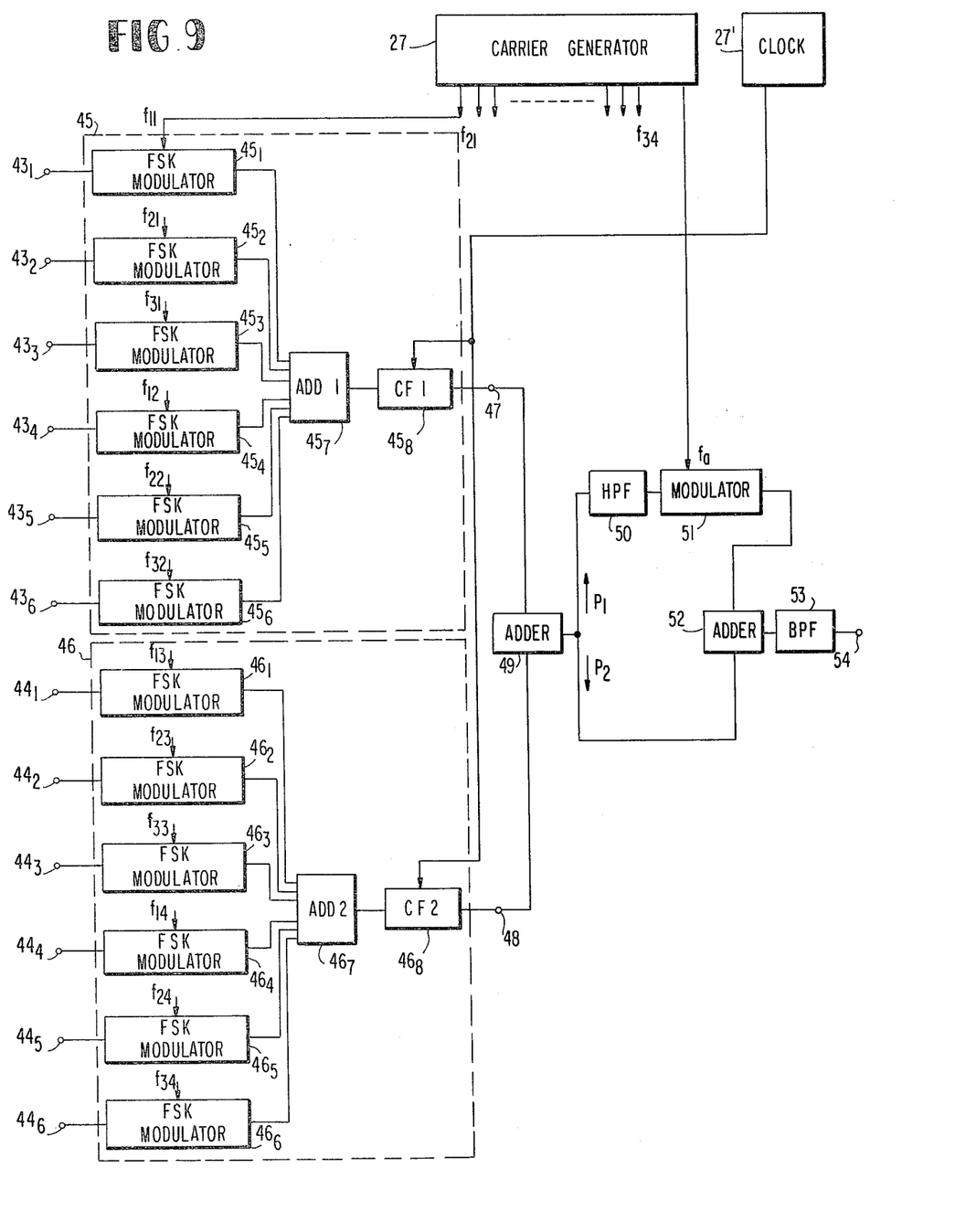
FIG. 9 shows a block diagram of a fourth embodiment of the present invention.

The fourth embodiment shown in FIG. 9 adapted to the 100 bauds carrier telegraphy has basic converter stages 45 and 46 which are the same as basic converter stages 36 and 37, respectively, of FIG. 7 except for the number of FSK-modulators. The difference between the construction of this embodiment and that of FIG. 7 lies in that the system of FIG. 9 comprises an adder 49 for combining the output signals of the converter stages 45 and 46 and also branching the thus combined signal into two signal paths, a high-pass filter 50 for eliminating a low-frequency component from the signal on one of the two signal paths, a modulator 51 for frequency-shifting the output signal of the high-pass filter 50, an adder 52 for combining the signal modulated by this modulator 51 with the signal on the other signal path, and a band-pass filter 53 for suppressing undesired components of the output signal of this adder 52.

Figure 10:
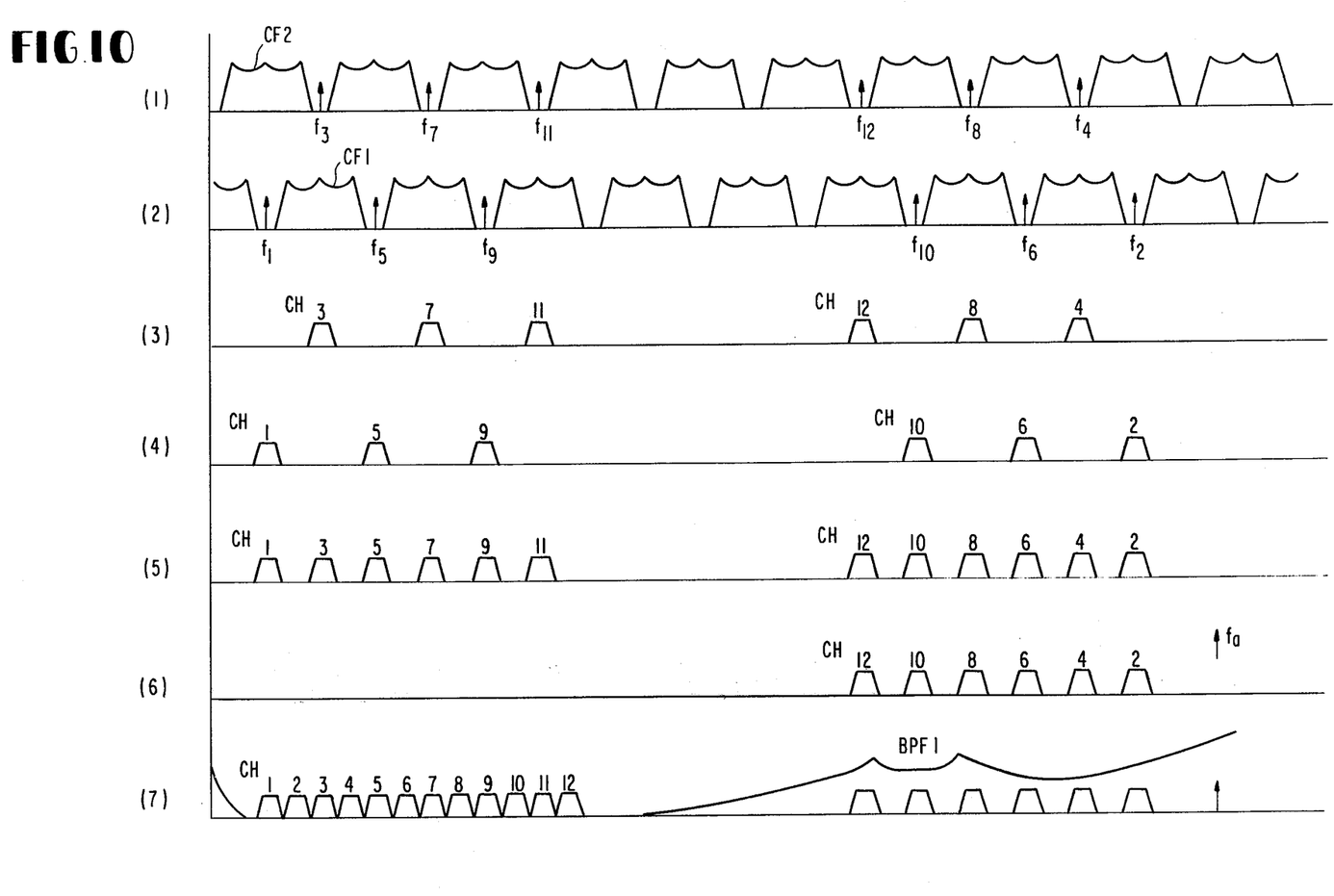
FIG. 10 shows a diagram for explaining the operation of the fourth embodiment.

Next, the operation of the fourth embodiment will be explained with reference to FIG. 10. Assuming that the center frequencies of the FSK-modulators $45_1$, $45_3$, $45_5$, $46_1$, $46_3$ and $46_5$ and $45_2$, $45_4$, $45_6$, $46_2$, $46_4$ and $46_6$ are equal to $f_1$, $f_5$, $f_9$, $f_3$, $f_7$ and $f_{11}$ and $f_2$, $f_6$, $f_{10}$, $f_4$, $f_8$, and $f_{12}$, respectively, the center frequencies $f_1$ to $f_{12}$ are frequency-converted in the FSK-modulators $45_1$ to $45_6$ and $46_1$ to $46_6$ by the telegraph signals given to the input terminals $43_1$ to $43_6$ and $44_1$ to $44_6$, respectively, thus converted signals are combined by the adder $45_7$ and $46_7$, respectively, and have their undesired spectra suppressed by the comb filters $45_8$ and $46_8$, respectively, as illustrated in lines 3 and 4 of FIG. 10. The suppressed signals are combined by the adder 49 and also branched into two signal paths, and the signal appearing on one of the signal paths has its low frequency components suppressed by the high-pass filter 50 as shown in line 6 (FIG. 10, line 6). The output signal of the high-pass filter 50 is, after being frequency-shifted by the modulator 51, combined with the signal appearing on the other signal path by the adder 52, and then, has its undesired components suppressed by the bandpass filters 53 as shown in FIG. 10, line 7.

It should be noted that the present system of FIG. 3 can be modified as follows:

(1) In at least one basic converter stage of FIG. 3, amplitude-modulators are interposed at the rear of the individual FSK-modulators while selecting the center frequencies of the carrier supplied to these FSK-modulators at the same frequency, and by appropriately selecting the carrier frequencies supplied to the interposed individual amplitude-modulators, and the individual transmission bands of the input signal components given to the subsequent comb filters are arranged on the frequency axis as shown in FIG. 4, lines 2 or 4.

(2) At the stage preceding the comb filters $15_5$ and $17_5$ of FIG. 3 are disposed amplitude-modulators, the center frequencies of the carriers supplied to the individual FSK-modulators in the basic converter stages 15 and 17 which include these comb filters $15_5$ and $17_5$ are made to coincide with the center frequencies of the carriers supplied to the individual FSK-modulators in the basic converter stages 14 and 16 which include the comb filters $14_5$ and $16_5$, and by appropriately selecting the carrier frequencies supplied to the interposed amplitude-modulators, the individual transmission bands of the input signal components fed to the comb filters $15_5$ and $17_5$ are arranged on the ferquency axis as shown in FIG. 4, line 4.

(3) Any arbitrary one basic converter stage of FIG. 3 is replaced by another basic converter stage that is combined with first said basic converter stage by one combining means, an amplitude-modulator is interposed at the rear of the comb filter in either one of the above-mentioned two basic converter stages including such replaced stage, and by appropriately selecting the carrier frequency supplied to that amplitude-modulator, the output signal of said combining means is made to have spectra shown in FIG. 4, line 6.

(4) The basic converter stage or stages of FIG. 3 are modified by employing at least two of the modifications (1), (2), and (3).

What is claimed is:

1. A frequency division multiplexed signal transmission system comprising, a plurality of carrier frequency modulators for modulating respective carrier frequencies applied thereto with respective modulating input signals applied thereto, means for applying a respective plurality of carrier frequencies to said plurality of modulators, said carrier frequencies having a predetermined separation frequency therebetween, means for combining the output modulated signals from said plurality of modulators, and comb filter means for suppressing undesired spectra in said combined output signals.

2. A frequency division multiplexed signal transmission system as claimed in claim 1 wherein said modulators are amplitude modulators, and wherein the band of each said input signal is $\Delta F_1$, and said carrier frequencies are separated by $\Delta F_2 \geq 2\Delta F_1$.

3. A frequency division multplexed signal transmission system as claimed in claim 2 further comprising a second plurality of carrier frequency modulators for modulating respective second carrier frequencies applied thereto with respective second signals applied thereto, means for applying a respective plurality of second carrier frequencies to said plurality of second modulators, said second carrier frequencies having a separation of $\Delta F_2$ and being separated by $\Delta F_2/2$ from said first carrier frequencies, second combining means for combining the output modulated signals from said second plurality of modulators, second comb filter means for suppressing undesired spectra in said combined spectra, and third adder means for combining the outputs of said first and second comb filter means.

4. A frequency division multiplexed signal transmission system as claimed in claim 3 wherein said first and second comb filters are digital comb filters.

5. A frequency division multiplexed signal transmission system as claimed in claim 4 wherein said first and second comb filters suppress the upper side bands of said modulated signals applied thereto.

6. A frequency division multiplexed signal transmission system comprising,
 (a) first through fourth converter means each comprising,
  (i) a plurality of carrier frequency modulator means for modulating respective carrier frequencies applied thereto with respective modulating signals applied thereto,
  (ii) means for combining the output modulated signals from said plurality of modulators, and
  (iii) comb filter means for suppressing undesired spectra in said combined output signals,
 (b) means for supplying to the plurality of modulator means of said first and third converter means a first plurality of carrier frequencies having carrier frequency separation $\Delta F_2$ and for supplying to the plurality of modulator means of said second and fourth converter means a second plurality of carrier frequencies having carrier frequency separation $\Delta F_2$, said second plurality of carriers being frequency separated from said first plurality of carriers by $\Delta F_2/2$,
 (c) second combining means for combining the outputs of said comb filters of said first and second converter means,
 (d) third combining means for combining the outputs of said comb filters of said third and fourth converter means,
 (e) phase shifting means for phase shifting the output of said third combining means by $\Delta F_2/4$, and
 (f) fourth combining means for combining the outputs of said second combining means and said phase shifting means.

7. A frequency division multiplexed signal transmission system as claimed in claim 6 wherein said modulating means are FSK modulators.

8. A frequency division multiplexed signal transmission system comprising:
 first and second basic converter stages each comprising a plurality of input terminals for modulation signals, a plurality of first modulator means provided in one-to-one correspondence to said input terminals and associated with a plurality of carriers having a predetermined frequency difference therebetween for frequency-modulation of said plurality of carriers with said plurality of modulation signals, respectively, first means for combining the modulated signals obtained from said plurality of first modulator means, and a comb filter means for suppressing undesired spectra in the output signal of said first combining means;
 second means for combining the output signals of said first and second basic converter stages;
 a second modulator for amplitude-modulating the output signal of said second combining means; and
 a band-pass filter for suppressing undesired spectra in the modulated signal obtained from said second modulator.

9. A frequency division multiplexed signal transmission system comprising:
 two basic converter stages each comprising a plurality of input terminals for modulation signals, a plurality of modulator means provided in one-to-one correspondence to said input terminals and associated with a plurality of carriers having a predetermined frequency difference therebetween for frequency-modulation of said plurality of carriers with said plurality of modulation signals, respectively, first means for combining the modulated signals obtained from said modulator means, and comb filter means for suppressing undesired spectra in the output signal of said first combining means;
 second means for combining the output signals of said two basic converter stages;
 a high-pass filter for suppressing a low frequency component of the output signal of said second combining means;
 frequency-shifter means for frequency-shifting the output signal of said high-pass filter;
 third means for combining the output signal of said frequency-shifter means and the output signal of said second combining means; and
 a band-pass filter for suppressing undesired spectra in the output signal of said third combining means.

* * * * *

UNITED STATES PATENT AND TRADEMARK OFFICE
CERTIFICATE OF CORRECTION

PATENT NO. : 4,145,575
DATED : March 20, 1979
INVENTOR(S) : Seiya SHIDA et al

It is certified that error appears in the above-identified patent and that said Letters Patent are hereby corrected as shown below:

Column 1, line 57 - after "of" delete "a"

line 58 - delete "filter" insert -- filters --

Column 3, line 15 - delete "8.9" insert -- 8.0 --

Column 4, line 17 - delete "THe" insert -- The -- line 60 - delete "$\Delta F_1/1$" insert -- $\Delta F_1$ --

Column 6, line 53 - delete "ferquency" insert -- frequency --

Column 7, line 18 - delete "multplexed" insert -- multiplexed --

Signed and Sealed this

Seventeenth Day of July 1979

[SEAL]

Attest:

LUTRELLE F. PARKER
*Attesting Officer*  *Acting Commissioner of Patents and Trademarks*